(12) United States Patent
Sethna et al.

(10) Patent No.: US 11,992,141 B2
(45) Date of Patent: May 28, 2024

(54) TUFTED CARPET

(71) Applicant: Aladdin Manufacturing Corporation, Calhoun, GA (US)

(72) Inventors: Michael Bejon Sethna, Jefferson City, TN (US); Christopher Lee Craig, Calhoun, GA (US); Luke Adam Bryson, Chatsworth, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

(21) Appl. No.: 17/904,041

(22) PCT Filed: Feb. 16, 2021

(86) PCT No.: PCT/US2021/018183
§ 371 (c)(1),
(2) Date: Aug. 11, 2022

(87) PCT Pub. No.: WO2021/167888
PCT Pub. Date: Aug. 26, 2021

(65) Prior Publication Data
US 2023/0064875 A1   Mar. 2, 2023

Related U.S. Application Data

(60) Provisional application No. 62/977,972, filed on Feb. 18, 2020.

(51) Int. Cl.
*A47G 27/02* (2006.01)
*A47G 27/04* (2006.01)
(Continued)

(52) U.S. Cl.
CPC ..... *A47G 27/0268* (2013.01); *A47G 27/0293* (2013.01); *A47G 27/0406* (2013.01);
(Continued)

(58) Field of Classification Search
CPC ............ A47G 27/0268; A47G 27/0293; A47G 27/0406; A47G 27/0475; B32B 3/02;
(Continued)

(56) References Cited

U.S. PATENT DOCUMENTS 3,893,238 A    7/1975 Scholl
2003/0161990 A1*  8/2003 Higgins ............... D06N 7/0086
                                                    428/95

(Continued)

FOREIGN PATENT DOCUMENTS

DE    1907071 A1 *  9/1970
DE    1907071 A1    9/1970

OTHER PUBLICATIONS

Wikipedia entry for "Scarf joint," https://en.wikipedia.org/wiki/Scarf_joint, printed Jun. 1, 2023.*

(Continued)

*Primary Examiner* — Cheryl Juska
(74) *Attorney, Agent, or Firm* — ALSTON & BIRD LLP

(57) ABSTRACT

A tufted carpet comprising a secondary backing which defines a volume being a parallelepiped having three pair of parallel faces, a first pair of parallel faces defining a upper surface of the secondary backing and a lower face of the tufted carpet, at least a second pair of parallel faces being inclined with respect to the first pair of parallel faces under an angle $\alpha 1$ less than 90°, preferably in the range of 10 to 87°, the angle being the smallest angle measured between the planes defining the first pair of parallel faces and second pair of parallel faces.

12 Claims, 2 Drawing Sheets

(51) Int. Cl.
  *B32B 3/02* (2006.01)
  *B32B 3/06* (2006.01)
  *B32B 3/14* (2006.01)
  *D06N 7/00* (2006.01)
  *B32B 5/02* (2006.01)
  *B32B 5/18* (2006.01)
  *B32B 5/24* (2006.01)
  *B32B 5/26* (2006.01)

(52) U.S. Cl.
  CPC ............ *A47G 27/0475* (2013.01); *B32B 3/02* (2013.01); *B32B 3/06* (2013.01); *B32B 3/14* (2013.01); *D06N 7/0071* (2013.01); *B32B 5/022* (2013.01); *B32B 5/024* (2013.01); *B32B 5/18* (2013.01); *B32B 5/245* (2013.01); *B32B 5/26* (2013.01); *B32B 2262/0284* (2013.01); *B32B 2471/02* (2013.01); *D06N 7/0081* (2013.01); *D06N 7/0086* (2013.01); *D06N 2211/066* (2013.01); *Y10T 428/23929* (2015.04); *Y10T 428/23979* (2015.04)

(58) Field of Classification Search
  CPC .... B32B 3/06; B32B 3/14; B32B 5/18; B32B 5/26; B32B 2471/02; D06N 7/0071; D06N 7/0081; D06N 7/0086; D06N 2211/066; D06N 2213/066; Y10T 428/23929; Y10T 428/23979
  See application file for complete search history.

(56) References Cited

U.S. PATENT DOCUMENTS

| 2005/0183559 | A1 | 8/2005 | Rue | |
| 2011/0289864 | A1* | 12/2011 | King | E04F 15/082 52/173.1 |

OTHER PUBLICATIONS

DE 1907071, pdf of German text, printed May 31, 2023.*
DE 1907071, pdf of translation of German text by Google Translate, printed May 31, 2023.*
International Search Report and Written Opinion for International Application No. PCT/US2021/018183, dated May 4, 2021, (15 pages), European Patent Office, Rijswijk, Netherlands.

* cited by examiner

TUFTED CARPET

CROSS REFERENCE TO RELATED APPLICATIONS

This application is a National Stage Application, filed under 35 U.S.C. § 371, of International Application No. PCT/US2021/018183, filed Feb. 16, 2021, which claims priority to U.S. Provisional Application No. 62/977,972, filed Feb. 18, 2020; the contents of both of which are hereby incorporated by reference in their entirety.

FIELD OF THE INVENTION

The present invention relates to tufted carpets, either broadloom carpets or carpet tiles, and a method of making the same.

BACKGROUND OF THE INVENTION

Tufted carpets and carpet tiles are known in the art.

Tufted carpets usually are sold as broad rolls of carpet which can cover a floor surface of a room in a whole when being rolled out. Such broad rolls are cumbersome for the do-it-yourself (DIY) person because they are awkward to handle and to transport. Also, such large rolls, up to several meters wide and weighing dozens of kilogram weight usually don't fit in private cars and cannot be carried with ease. In the event two such carpets are to be placed one adjacent to the other, it is difficult to place them without the seam between both to be visible.

The use of carpet tiles to cover a floor is more handy from point of view of transporting the carpet tiles and carrying them, as they have smaller dimensions and can be carried in packages having less weight. However, the difficulty of placing them without visible seams is more pronounced with carpet tiles because more seams are likely to be present.

SUMMARY OF THE INVENTION

It is an object of the present invention to provide a tufted carpet, such as a broadloom carpet or carpet tile, which is easier to install with less or invisible seams. It is an object of the invention to provide tufted carpets in lower width dimension than traditional carpets, allowing easier installation with less or invisible seams.

The above objective is accomplished by a tufted carpet according to the present invention.

According to a first aspect, a tufted carpet is provided, which comprises a secondary backing which defines a volume being a parallelepiped having three pairs of parallel faces, a first pair of parallel faces defining an upper surface of the secondary backing and a lower face of the tufted carpet, at least a second pair of parallel faces being inclined with respect to the first pair of parallel faces about an angle $\alpha 1$ less than 90°, preferably in the range of 10 to 87°, the angle being the smallest angle measured between the planes defining the first pair of parallel faces and the second pair of parallel faces.

More preferred is an angle $\alpha 1$ in the range of 20 to 70°, such as between 30 and 60°.

The angle between two faces is measured by defining the two intersection lines of both faces with a plane perpendicular to both faces, and measuring the angle between said intersection lines.

For clarity, the maximum angle $\alpha 1$ between the first and second pair of parallel faces is 90°, where the first and second pair of parallel faces are perpendicular to each other. For tufted carpets according to the invention, this angle is smaller, hence each of the faces of the first pair is inclined from the vertical in view of any of the faces of the second pair of faces. Though the angle $\alpha 1$ may reach 0°, an angle of less than 10° is usually not practical.

According to some embodiments, the third pair of parallel faces may be perpendicular with respect to the first pair of parallel faces.

According to some embodiments, the third pair of parallel faces may be inclined with respect to the first pair of parallel faces about an angle $\alpha 2$ being less than 90°, preferably in the range of 10 to 87°, the angle being the smallest angle measured between the planes defining the first pair of parallel faces and third pair of parallel faces.

More preferred is an angle $\alpha 2$ in the range of 20 to 70°, such as between 30 and 60°.

According to some embodiments, $\alpha 1$ is substantially equal to $\alpha 2$.

According to some embodiments, the first pair of two parallel faces may define rectangles or squares.

The tufted carpet may be a tufted carpet tile, typically having dimensions of 15 cm to 125 cm for both long and short side. Optimally, the tufted carpet tile is square with sides in the range of 15 cm to 125 cm. For a tufted carpet tile, preferably the second and third pair of faces of the secondary backing are inclined to the lower surface defined by the secondary backing. The tufted carpet according to the invention may be provided as a broadloom carpet. The width of the carpet may vary in a range of 60 to 460 cm, the length may vary and be of magnitude of several meters. Preferably at least the second or third pair of faces of the secondary backing providing the long side of the broadloom carpet, is inclined to the lower surface defined by the secondary backing.

According to some embodiments, the first pair of parallel faces may define rectangles, the second pair of parallel faces providing the long sides of the tufted carpet.

As the seams of two adjacent carpets laid down on the floor is less visible, more seams per room can be provided. As such the width of the broadloom, possibly coiled, carpets can be limited to less than 2 m, such as in the range of 0.4 to 2 m, e.g. in a range of 0.45 to 1.5 m.

According to some embodiments, the tufted carpet may be coiled.

According to a second aspect of the invention, a tufted carpet is provided, which comprises a secondary backing which defines a volume being confined by a first pair of rectangular and mutually parallel faces and four optionally non-planar faces, each optionally non-planar face coupling a first edge of a first rectangular face to the corresponding edge of the second rectangular face, the first of the two parallel and rectangular faces defining the upper surface of the secondary backing and the lower surface of the tufted carpet, the four optionally non-planar faces being two pairs of parallel faces, wherein for at least one of the two pairs of parallel faces, the perpendicular projection of one of the two faces has a point inside the perimeter defined by the rectangular face defining the lower surface, the perpendicular projection of the other of the two faces having a point outside the perimeter defined by the rectangular face defining the lower surface.

According to some embodiments, for at least the other of the two pairs of parallel faces, the perpendicular projection of one of the two faces may have a point inside the perimeter defined by the rectangular face defining the lower surface, the perpendicular projection of the other of the two faces having a point outside the perimeter defined by the rectangular face defining the lower surface.

It is understood that the material from which the tufted carpets of the invention can be made are not limited. Preferably the tuft yarn used for tufting the pile of the tufted carpet, may be wool, cotton or any polymeric material used in tufted carpet industry, such as polyamides (PA6, PA6.6, PA10, PA6.10), polypropylene (PP), polyethylene (PE), polyester (PES, such as polyethylene terephthalate (PET), polytrimethylene terephthalate (PTT) and polybutylene terephthalate (PBT)), even recycled polyester such as recycled polyethylene terephthalate (rPET), and alike.

The tuft carpet may have a unicolor or may be provided with a color design. This color may be provided by printing on or coloring a unicolor tufted pole, or may be provided by using colored tuft yarns.

The number of tufts per $cm^2$ may vary widely and is dependent on the tufting gauge and stitch rate. The height of the tufts (also referred to as pole height) is not limited but may be in the range of e.g. 0.35 cm to 2.5 cm. Tuft height may be uniform or may vary over the surface of the tufted carpet. The tufts may be cut tufts (or cut pole) or loop tufts (or loop poles), or any combination of these. The weight of the tuft per surface unit, i.e. the face weight, may also vary widely, such as being in the range of 600 gram per $m^2$ to 2800 gram per $m^2$.

The primary backing may be a woven or nonwoven textile primary backing. It may be made from any suitable material, such as polymeric fibers of filaments, like PES, PA of PP fibers or filaments. Typically, the primary backing has a surface weight in the range of 65 gram per $m^2$ to 180 gram per $m^2$.

The tufts penetrate through the primary backing, providing at the one side of the primary backing the tufted surface or pole surface. At the other, second side of the primary backing, tuft loops are present. The tuft loops may be anchored to the second side of the primary backing by means of a glue, like a hot melt glue, such as a coPET hot melt resin. This glue may also be used to anchor the secondary backing to this second surface of the primary backing. In case the secondary backing is a foam material, the material of the secondary backing may replace the glue.

Secondary backing may be provided as a foam, like a polyurethane (PU) foamed secondary backing or a polyolefin secondary backing, or may be provided as a nonwoven secondary backing. This nonwoven secondary backing may be a polymeric fiber nonwoven, such as a PES, PA or PP nonwoven. This is particularly true for tufted carpets being broadloom carpet. The nonwoven may be a needle punched or air laid nonwoven, e.g. a needle punched or air laid PET fiber nonwoven. The nonwoven may comprise low melt fibers and/or may comprise bicomponent fibers, such as core sheath fibers with low melt sheath, and may be anchored to the primary backing by appropriate application of heat, thereby melting the low melt fibers at least to some extent.

For carpet tiles, the secondary backing preferably may be bitumen or a similar material.

The density of the secondary backing may range from 95 $kg/m^3$ to 160 $kg/m^3$, such as in the range of 120 to 144 $kg/m^3$.

The thickness of the secondary backing man be in the range of 3 to 9 mm, such as in the range of 6.5 to 8.2 mm.

The tufted carpet according to the invention may be used as regular carpet in residential environments (like living rooms, sleeping rooms and alike), or in more demanding areas such as a commercial area, like theaters, stores, cinemas and alike. The tufted carpet may even be used as artificial grass and used in sport environments.

According to some embodiments, the secondary backing may be a PU foam.

According to some embodiments, the secondary backing may be provided, at its lower side, with an adhesive and optionally a release coating. As such a peal and stick carpet or carpet tile can be provided.

According to a third aspect of the invention, a floor covering is provided, which comprises at least two tufted carpets according to the first or second or below mentioned seventh aspect of the invention, said two tufted carpets are mounted adjacent to each other such that one face of the second pair of faces of the first tufted carpet is in contact with one face of the second pair of faces of the second tufted carpet.

According to a fourth aspect of the invention, the use of at least two tufted carpets according to the first or second aspect of the invention is provided, which use is to provide a floor covering.

According to a fifth aspect of the invention, a method to provide tufted carpet comprises the steps of
  a. Making a tufted greige comprising a plurality of tufts penetrating and sticking out on a first side of a primary backing;
  b. Anchoring the tufts at the second side of the primary backing;
  c. Applying a secondary backing to the second side of the primary backing;
  d. Cutting the obtained intermediate into at least one tufted carpet according to one of the earlier mentioned aspects, by using cutting means which cut the secondary backing non-perpendicular to the lower surface of the secondary backing.

The steps b and c can be done simultaneously by applying the secondary backing to the second, backside of the primary backing.

Preferably the cutting tool used to cut the intermediate in step d is a cutting tool, such as a fixed or rotating knife, which cuts the primary and secondary backing. This cutting action may be done from the backside of the carpet, while the carpet is oriented with its tufted surface upwards.

According to a further, sixth aspect of the invention, a machine to cut tufted carpets is provided, the carpet, comprising a tufted surface on a primary backing, and being provided with a secondary backing, wherein the machine comprises a carrying table to carry the tufted carpet with its tufted surface upwards, away from the table surface, and comprising at least a first cutting tool comprising a knife which sticks out and is oriented upwards from the carrying table surface.

The knife preferably is a rotating knife. Preferably the knifes may be angled to the vertical. Most preferably the angle can be adjusted in order to vary the inclination of the section of the secondary backing.

Optionally, the machine comprises a pressure exercising means to exercise a pressure downwards, i.e. to the tufted top side of the carpet being cut. This pressure exercising means may be a simple blade spring, and exercises sufficient downward pressure in order to ensure the secondary backing contacts the carrying table.

According to a further, seventh independent aspect, the present invention is a carpet, preferably a carpet tile, comprising one or more backings which define a volume being a parallelepiped having three pairs of faces, a first pair of faces defining respectively an upper face of said one or more backings and a lower face of the carpet, at least a second pair of faces, wherein a first face and a second face of said second pair of faces is inclined with respect to the first pair of faces, preferably by an angle α1 less than 90°, preferably in the range of 10 to 87°. Preferably at least the secondary backing and potentially exclusively the secondary backing, of such carpet defines said parallelepiped volume. Herein a first face of said second pair of faces is preferably inclined inwardly from the lower face to the upper face, while a second face of said second pair of faces is inclined outwardly from the lower face to the upper face of the carpet. Said first pair of faces may generally be parallel. Said second pair of faces may be parallel, or, in accordance with a variant, said first face and said second face are inclined at angles differing from one another by 0.5 to 10°, and/or said second face is inclined at a smaller angle than said first face.

By means of slightly different angles an accurate matching at the top edges of the carpet can be attained, with minimized obstruction by a possible contact between the second pair of faces below the surface of the carpet. In the mounted condition of two such carpets adjacent to each other, the contact between said second pair of faces may be limited to a contact on portion of said faces near the top edges of the carpet and/or backings.

According to a variant of above aspects, instead of a tufted carpet tile, the invention concerns a woven carpet tile or a tile based on a thermoplastic material, for example CaCO3 filled polyvinyl chloride with a plasticizer content of 5 phr or above, or a tile based on elastomeric material, like rubber. Such thermoplastic or elastomeric tiles are formed of a thermoplastic respectively elastomeric core and preferably a decorative top layer provided on said core. In such cases, it is at least the core materials that are formed to have said second pair of faces extending at the required angles.

According to still a further variant of above aspects, at least one face of said second pair of faces extends curvilinearly or in another non-linear way. In such case, the faces of said second pair of faces preferably extend such that in an adjacently mounted condition of two carpets or carpet tiles the faces do not obstruct forming a contact at the upper edges and/or such that a least square line plotted through the respective faces is extending at the mentioned angles. Preferably the least square line through a first face of said second pair is inclined inwardly from the lower face to the upper face, while the least square line through a second face of said second pair is inclined outwardly from the lower face to the upper face.

According to still a preferred embodiment, at least one, and preferably both of the faces of said second pair of faces are provided with a substantially vertically or vertically extending portion near the top edge. At this portion a contact may be formed between carpets or carpet tiles in an adjacently mounted condition.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DESCRIPTION OF ILLUSTRATIVE EMBODIMENTS

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

Figure 1:
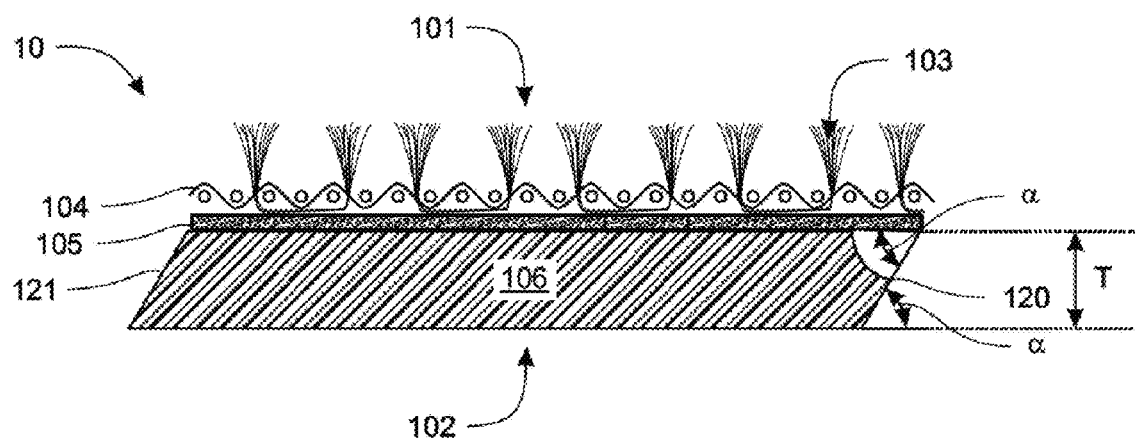
FIG. 1 is a schematic view of a tufted carpet perpendicular cross section, perpendicular to the lower surface of the carpet according to the invention.
Figure 2:
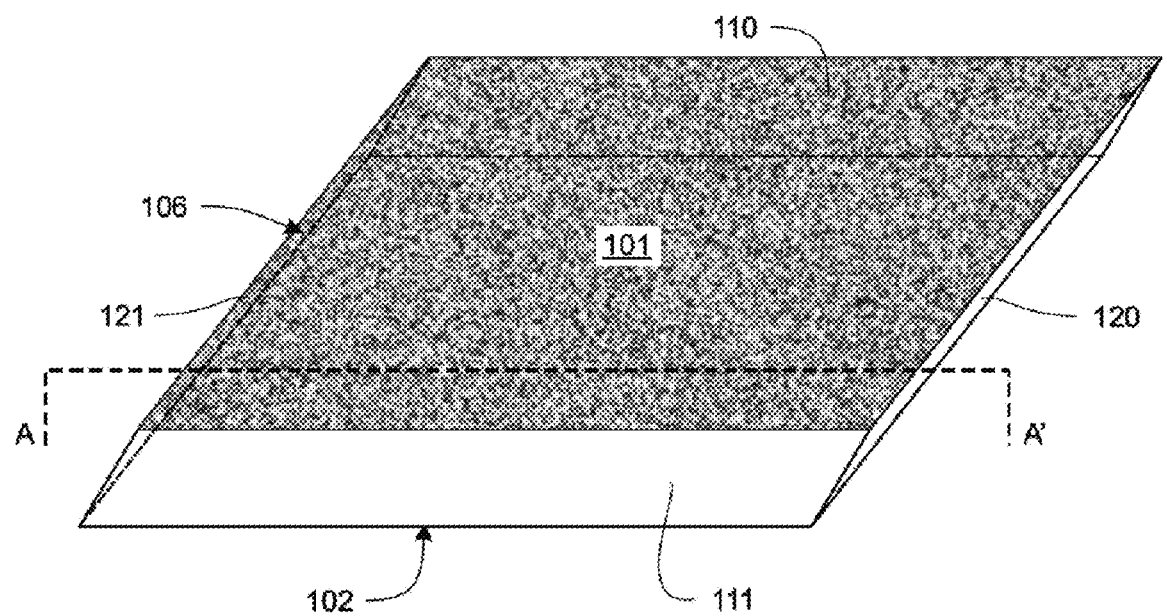
FIG. 2 is schematic view of a tufted carpet tile according to the invention.

A perpendicular cross section of a tufted carpet tile 10 according to the invention is shown in FIG. 1. The cross section is made according to the plane AA' as shown in FIG. 2. The tufted carpet 10 comprises an upper side 101 provided by the tufts 103 (or poles or piles). In an embodiment, a cut pile surface 101 is provided. The tufts 103 are made from polymeric yarn, such as PA, PES, PP or any other polyolefin material. The height of the tufts 103, i.e. the distance between a first surface 107 of the primary backing 104 and the outmost point of the tufts, is about 10 mm. In alternative embodiments, the height of the tufts may vary between 0.38 mm and 2.4 mm.

The primary backing 104 is a woven fabric from PET and having a surface weight in the range of 67 to 170 gram/m². In the alternative, a non-woven fabric from PET and having a surface weight in the range of 67 to 170 gram/m² is used.

At the second side or surface 109 of the primary backing 104, the tufts are anchored to the second side 109 of the primary backing 104 by means of a glue 105 being a hot melt PET glue. A secondary backing 106 adheres to the second side 109 of the primary backing by this same glue layer 105.

The secondary backing 106 provides a lower surface of the tufted carpet 10. The secondary backing 106 is a nonwoven, preferably from PET fibers, with surface weight of 112 to 145 g/m2 and a thickness T of 6.6 to 7.2 mm.

The secondary backing 106 defines a volume being a parallelepiped having three pair of parallel faces, a first pair of parallel faces 102a and 102b partially defining the lower face 102 of the tufted carpet 10.

A second pair of parallel faces 120 and 121 are inclined with respect to the first pair of parallel faces 102a and 102b about an angle α1 of 60°.

As shown in FIG. 2, also a third pair of faces 110 and 111 can be inclined with respect to the second surface of the tufted carpet 10. The third pair of parallel faces 110 and 111 are inclined with respect to the first pair of two parallel faces 102a and 102b about an angle α2 of 60°.

It is understood that instead of being a tile with smaller dimensions (such as 50 by 50 cm$^2$), as shown in FIG. 2, the sides 120 and 121 can be much longer. A tufted carpet 10 of dimension 1.22 cm wide and 365 cm long can be provided. This tufted carpet 10 can be coiled to a roll.

Figure 3:
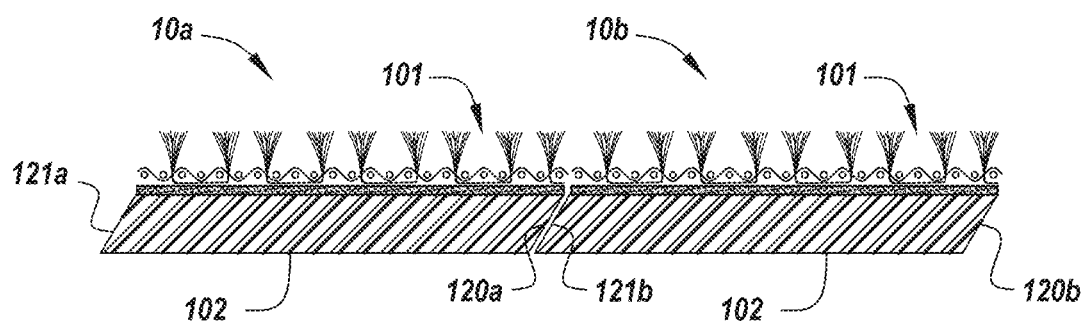
FIG. 3 is a schematic view of a floor covering, being a perpendicular cross section, perpendicular to the lower surface of the floor covering according to the invention.

FIG. 3 illustrates two tufted carpets 10a and 10b (identical to the tufted carpet 10 of FIGS. 1 and 2) are mounted adjacent to one another on a floor surface, thereby providing a floor covering. One face 120a of the first tufted carpet 10a is adjacent and in contact with the face 121b of the second tufted carpet 10b; the seam provided by the contact along faces 120a and 121b is less visible as the carpet surfaces are smoothly contacting one to another. The overlap causes the floor, on which the tufted carpets are laid, to be hidden from a perpendicular view, wherein the view is perpendicular to the upper surface 101 of the tufted carpets 10a and 10b. This can happen even if both tufted carpets 10a and 10b do not optimally match and overlap along the faces 120a and 121b.

Figure 3A:
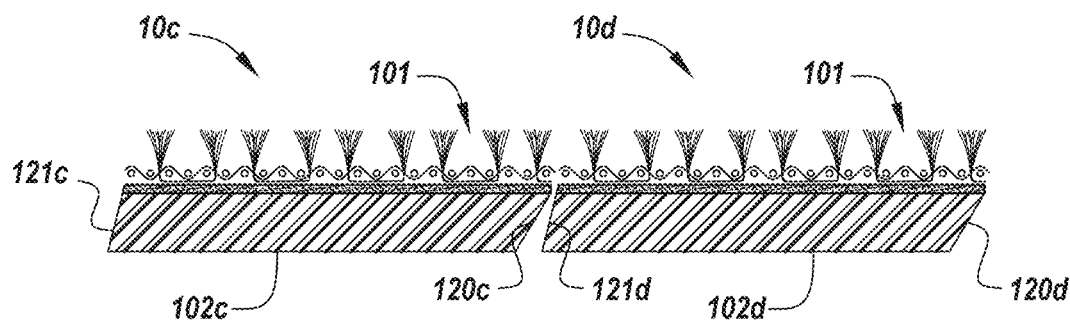
FIG. 3A is a schematic view of a floor covering, being a perpendicular cross section, perpendicular to the lower surface of the floor covering according to the invention.

FIG. 3A illustrates an embodiment where tufted carpets 10c and 10d having different edge angles are mounted adjacent to one another on a floor surface. In the mounted condition of two such carpets adjacent to each other, the contact between said second pair of faces may be limited to a contact on a portion of said faces near the top edges of the carpet and/or backings. In this embodiment, the angles from the bottoms 102c and 102d and the left edges 121c and 121d of each tufted carpet 10c and 10d are the same. Also, the angles from the bottoms 102c and 102d and the right edge 120c and 120d of each tufted carpet 10c and 10d are also the same. However, the angles from the right edge 121c and the left edge 120c to the bottom 102c of the left tufted carpet 10c are not supplementary. Similarly, the angles from the right edge 121d and the right edge 120d to the bottom 102d of the right tufted carpet 10d are not supplementary. Instead, the edges may incline at angles differing from one another by 0.5 to 10°.

Figure 4:
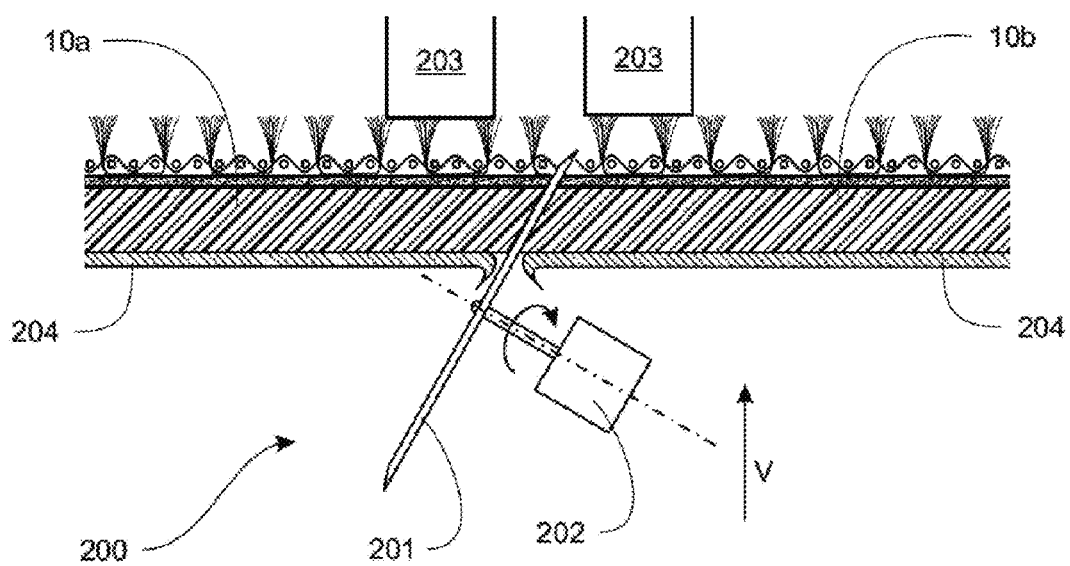
FIG. 4 is a schematic view of a method to manufacture tufted carpet according to the invention.

FIG. 4 shows a machine 200 which is fit to cut tufted carpets 10a and 10b. A rotating knife 201, driven by a motor 202, is oriented upwards between two parts of a carrying table 204. On the upper side, a blade spring means 203 exercises pressure to the tufted surface of the tufted carpet 10. This force ensures the secondary backing 106 contacts the carrying table surface during cutting.

The knife cuts the secondary 106 and primary backing 104 of the tufted carpet 10, while it avoids to a large extent interaction with the tufts of the carpet 10. As can be seen, the knife 201 is oriented angled versus the vertical V, such that the carpets made are provided with an angled cut secondary backing.

It is to be understood that although preferred embodiments and/or materials have been discussed for providing embodiments according to the present invention, various modifications or changes may be made without departing from the scope and spirit of this invention.

The invention claimed is:

1. A tufted carpet tile having three pairs of faces comprising:
   a first pair of generally parallel faces comprising a top face of carpet tufts and a bottom face of a secondary backing;
   a second pair of faces consisting of a first edge face and a second edge face being inclined with respect to the first pair of generally parallel faces;
   a third pair of faces adjacent to the first pair of generally parallel faces and adjacent to the second pair of faces;
   wherein a first edge angle between the first pair of generally parallel faces and the first edge face is different than a second edge angle between the first pair of generally parallel faces and the second edge face; and
   wherein each of the first and second edge angles are the smallest angles measured between the planes defining the first pair of generally parallel faces and each of the edge faces.

2. The tufted carpet tile of claim 1, wherein the first and second edge angles are between about 10° and about 87°.

3. The tufted carpet tile of claim 1, wherein the first edge angle is smaller than the second edge angle.

4. The tufted carpet tile of claim 1, wherein the third pair of faces consists of a third edge face and a fourth edge face inclined with respect to the first pair of generally parallel faces, wherein a third edge angle between the first pair of generally parallel faces and the third edge face is different than a fourth edge angle between the first pair of generally parallel faces and the fourth edge face, and wherein each of the third and fourth edge angles are the smallest angles measured between the planes defining the first pair of generally parallel faces and each of the edge faces.

5. The tufted carpet tile of claim 4, wherein the first edge angle is substantially the same as the third edge angle.

6. The tufted carpet tile of claim 1, wherein the first pair of generally parallel faces comprise squares or rectangles.

7. The tufted carpet tile of claim 1, wherein the first pair of generally parallel faces comprise rectangles comprising short sides and long sides, and wherein the second pair of faces are along the long sides.

8. The tufted carpet tile of claim 7, wherein the tufted carpet tile is configured to be coiled into a roll.

9. A carpet comprising:
   one or more backings which define a volume having three pairs of faces;
   a first pair of faces defining respectively an upper face of said one or more backings and a lower face of the carpet;
   a second pair of faces, wherein a first face and a second face of said second pair of faces are each inclined with respect to the first pair of faces by angles of less than 90°, and wherein a first face of said second pair of faces is inclined inwardly from the lower face to the upper face, and a second face of said second pair of faces is inclined outwardly from the lower face to the upper face of the carpet;
   a third pair of faces; and
   wherein the angle between the first face and the first pair of faces is different than the angle between the second face and the first pair of faces.

10. The tufted carpet tile of claim 9, wherein the angles are between about 10° and about 87°.

11. The carpet of claim 9, wherein said first face and said second face are inclined at angles differing from one another by 0.5° to 10°.

12. The carpet of claim 9, wherein said second face is inclined at a smaller angle than said first face.

\* \* \* \* \*

UNITED STATES PATENT AND TRADEMARK OFFICE
CERTIFICATE OF CORRECTION

PATENT NO. : 11,992,141 B2
APPLICATION NO. : 17/904041
DATED : May 28, 2024
INVENTOR(S) : Michael Bejon Sethna et al.

It is certified that error appears in the above-identified patent and that said Letters Patent is hereby corrected as shown below:

In the Claims

In Column 9, Line 1, Claim 10, delete "tufted carpet tile" and insert -- carpet --, therefor.

Signed and Sealed this
First Day of October, 2024

Katherine Kelly Vidal
*Director of the United States Patent and Trademark Office*